PROCESS FOR PREPARING DEHYDRATED FOODS

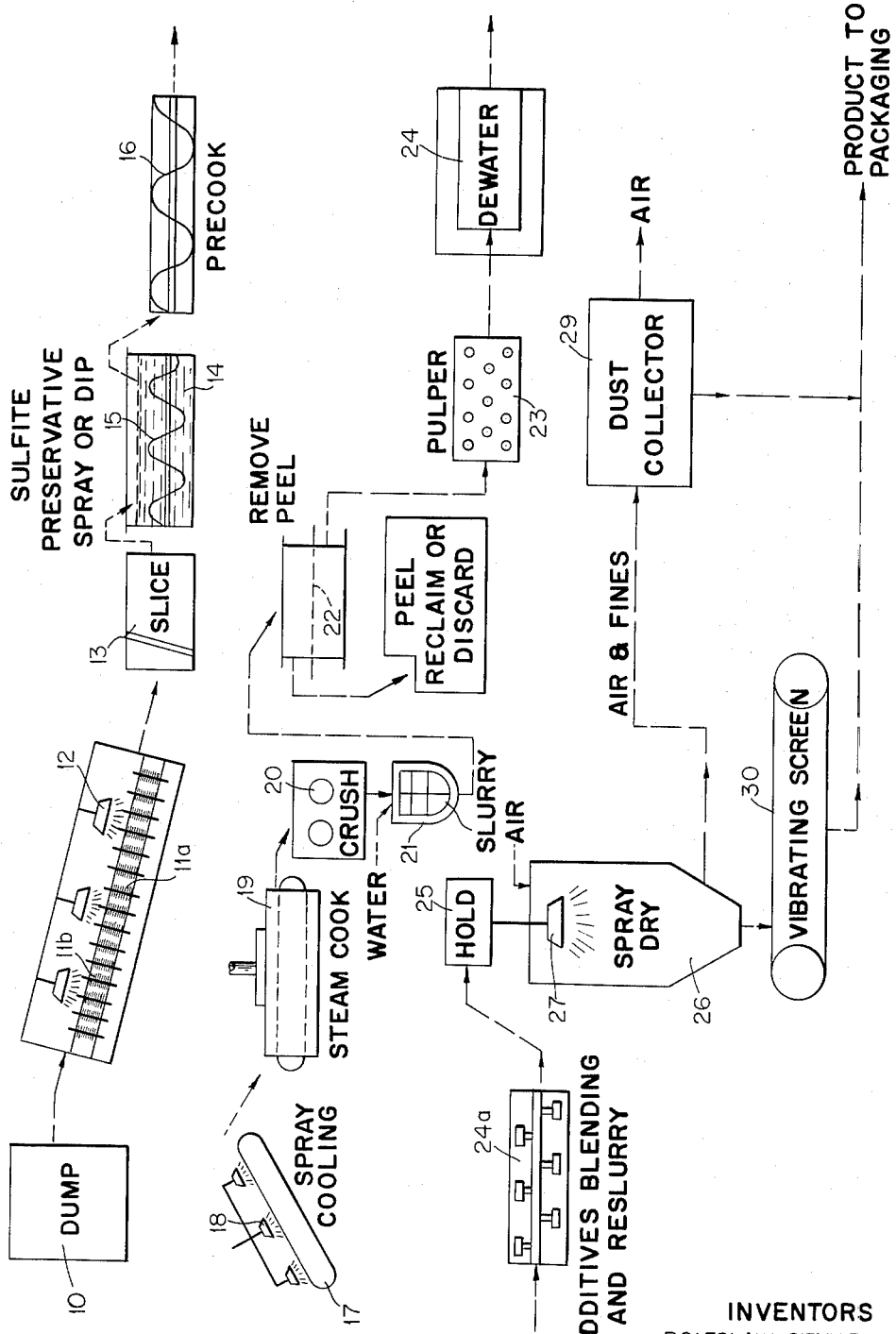

Boleslaw Sienkiewicz, Pearl River, N.Y., and Frank Hollis, Jr., Hillsdale, N.J., assignors to General Foods Corporation, White Plains, N.Y., a corporation of Delaware
Filed Dec. 24, 1962, Ser. No. 246,832
9 Claims. (Cl. 99—207)

The present invention relates generally to a process for preparing dehydrated foods which can be reconstituted in water, milk or other aqueous media to form a ready-to-eat product. More particularly, it concerns a process for producing a dehydrated potato product which on reconstitution yields mashed potatoes having superior characteristics.

Many techniques have been employed by workers in this art in attempts to obtain a dehydrated mashed potato product which will receive strong and immediate consumer acceptance when it is marketed. For example, potatoes have been peeled, cooked, mashed and then dried between or on rolls or drums, or extruded in the form of filaments. When the potato product is to be reconstituted in the form of mashed potatoes, the so-called "add back" process has achieved a degree of success. In this process, particles of dried, granulated or other forms of dehydrated potatoes are added back to the wet mash.

All of the prior art processes have certain disadvantages, a primary disadvantage being that the dehydrated product which is the end result of the process has, in the course of its treatment and dehydration, been subjected to mechanical forces which cause potato cell rupture and the release of free starch. In fact, the presence of free starch in the dehydrated potato product, has almost become a factor to be accepted; however, free starch introduces pastiness into the reconstituted product, particularly when the product is to be reconstituted using boiling water or milk. While the "add back" process may yield a product which has a reduced degree of pastiness, this process repeatedly exposes the same potatoes to elevated drying temperatures and microbial contamination. Consequently, the repeatedly reprocessed potatoes suffer from flavor deterioration and may have poor storage stability; even under the most sanitary conditions, the mashed potatoes may become contaminated with microorganisms.

A further requirement of dehydrated potatoes which will meet with good consumer acceptance upon rehydration to form a mashed potato product is a dehydrated potato product having a preferred bulk density in the intermediate range, i.e., 0.4 to 0.75 gram per cc. A dehydrated product of this density is not so bulky that it requires packaging in a container of an uneconomic size, yet it has sufficient bulk to satisfy the consumer's expectation of equivalency between mashes prepared from a dehydrated product and those prepared directly from a raw potato. In the case of dehydrated, drum-dried mashed potato flakes, the product has a bulk density of about 0.2 gram per cc. Flakes like this may be undesirable due to high packaging costs, but may be subdivided to increase that bulk density. Such subdivision and, in fact, any mechanical working of a potato product, tends to mechanically rupture potato cells and thereby liberate free starch and contribute to pastiness of the potatoes reconstituted from the product. One process for preparing dehydrated potatoes which reconstitute to a mashed potato product of intermediate bulk density is a spray-drying process. Spray-dried potatoes do have a bulk density which is in the desirable intermediate range. The process of spray-drying potatoes to produce a dehydrated product, however, appears to be particularly susceptible to cell rupture and the consequent liberation of free starch. The free starch tends to result in a dehydrated product which upon reconstitution is gummy and pasty. Such texture is highly undesirable.

In order to avoid rupture of potato cells, the prior art has apparently attempted to strengthen the cell walls of the potatoes as those cells are processed through precooking, cooking, mashing, slurrying and spray-drying steps of the method. Thus, it has been found expedient to include a water-cooling step between the preliminary blanching or precooking and final cooking of the potatoes. Regardless of the above foregoing steps, these measures have not been entirely successful.

It is, therefore, a primary object of the present invention to provide a method of preparing a spray-dried potato product which will reconstitute in water, milk or other aqueous media to a product closely resembling freshly mashed potatoes and without the pastiness of texture which has marred similar products of the prior art.

It has now been discovered that when a combination of process steps are utilized subsequent to cooking and mashing the potatoes, which steps include slurrying the mashed potatoes, screening the slurried potatoes to remove defects, dewatering the potato slurry to a filter cake and then reslurrying the dewatered potatoes, the subsequently spray-dried product will reconstitute to a mashed potato product having a highly desirable texture which is neither grainy or pasty. While the reasons are not completely known why the combination of steps set forth hereinbefore result in a product which has the aforementioned good texture characteristics, it is believed that producing a slurry of the mashed potatoes results in a breaking down of agglomerates of potato cells such that the individual cells or small aggregates thereof are more suitable for spray-drying without incurring cell rupture due to the mechanical stresses imposed upon those cells during the spray-drying.

In addition, slurrying puts the potato mash in an advantageous condition so that on subsequent screening the undesirable potato portions will be easily removed therefrom.

Slurrying of the individual potato cells also results in certain materials which inhibit effective spray-drying being put in condition for subsequent removal from the potato system. This slurrying puts into the slurry water free and solubilized starch, fat, protein, sugars, browning precursors and off-flavor reactants. These materials in the slurry water are removed by a dewatering step, after which the filter cake produced by that step is reslurried, mixed with additives if desired, and then spray-dried.

By virtue of this combination of three steps: slurrying cooked, mashed potatoes, dewatering the slurry, and reslurrying the dewatered filter cake, spray-drying is able to be carried out in a manner which leads to the formation of a highly acceptable product in comparison with spray-dried products of the prior art. The reason why we believe that these three steps improve the product that results from spray-drying is because they bring about a reslurry that is substantially free of soluble materials in addition to the discrete potato particles. It will be apparent that if there are two phases, i.e., liquid and solid phases, to be dehydrated, one set of spray-drying conditions will not be effective in drying both phases. Further, the operation of equipment used to atomize material for spray-drying will necessarily be different for the two phases. When materials such as solubilized starch, proteins and sugars remain in the slurry water, there is a liquid phase to be dehydrated in addition to the solid phase consisting of potato particles and water. At spray-drying conditions that effectively dry the potato cells, the sugar in the liquid phase will toast and tan. Yet such spray-drying temperatures are required to dehydrate the liquid around and the liquid within the potato cells until the cells have a moisture content of about 5 to 6½ percent.

It has been found that removal of these solubilized materials enables solid phase to be dried without the interference of a liquid phase simultaneously undergoing dehydration. Unless the potato slurry is dewatered, the solubles therein tend to form a coating around the potato cells during spray-drying. This coating interferes with the diffusion of water from within the cells and results in an improperly dried product. Thus the three steps set forth herein are critical with respect to a subsequent spray-drying operation.

The potatoes are slurried directly after they have been cooked and mashed. Sufficient aqueous medium is added to the cooked potatoes to form a fluid slurry of the potatoes in the medium. While the precise degree of dilution of the potato mash with an aqueous medium will vary, it has been found that a general range of about 7 to 16 percent solids content of the slurry after dilution is most preferred. Generally, the amount of water or aqueous medium added should be such as to put the slurry in a fluid state in which it can easily be subjected to mechanical separation of portions thereof, while limiting the quantity of water to a level at which there will not be an excessive amount of solubilization of starches and sugars and at which it will still be economic to dewater the screened slurry at a later step in the process.

While the temperature of the slurry and the length of time during which the potatoes are maintained in the form of a slurry may vary in accordance with the type, storage and previous processing of the potatoes, the temperature should be low enough so that undesirable bacteriological and chemical reactions do not occur and the cell walls are not unduly weakened whereby they will be unduly prone to subsequent rupture. At too high a temperature, the reactions and cell wall rupture set forth above may lead to loss of flavor and color, oxidative rancidity, and excessive pastiness. A slurry temperature range between 60° and 180° F. has been found operable.

The slurry is now subjected to a mechanical separation in which eyes, rot, and parts of the skin, if the potatoes have not been completely peeled, are separated from the slurry. Any and all of these potato parts and defects are referred to herein as undesirable potato portions. An efficient method of effecting such mechanical separation is to pass the slurry over screens through which the aqueous medium and desirable potato portions will pass and on which the undesirable potato portions will be suspended. Preferably, the slurry is passed through a U.S. No. 4 to 14 screen, most preferably a vibrating U.S. No. 5 screen, in order to remove undesirable potato portions. After these portions have been removed, the thrus are comprised of a slurry containing screened potato particles with some amounts of solubilized, ruptured starch and solubilized reducing sugars and proteins, in addition to some specks of peel, eyes and rot. The amount of ruptured starch cells may be reduced by a precook-quench treatment to which the raw potatoes have previously been subjected.

Although not mandatory, it has been found advantageous to remove the remaining specks of peel, eyes and rot by passing the once-screened slurry over another screening device, such as a vibrating, 20-mesh screen, with apertures of from about 0.018 to 0.040 inch in maximum dimension, preferably 0.020 to 0.030 inch, or a pulper with similar apertures. The specks of peel, eyes and rot are retained on the screen.

Following the mechanical separation of undesirable potato portions, the slurry is dewatered to remove large quantities of free and solubilized starch, soluble reducing sugars and some of the proteins which have been solubilized in the slurry medium. Also removed are fats and free amino acids. The more water that is drawn off, the more undesirable factors that are removed from the potato slurry. Most advantageously, dewatering is carried out until the solids content of the dewatered potatoes is substantially equal to the solids content of the raw potatoes being processed. While dewatering may be effected by various types of vacuum filtration, centrifugation and the like, the use of a horizontal vacuum filter is preferred. In any case, dewatering should be carried out at least until the solids content of the potato filter cake which issues from the dewatering equipment is about 14 to 22%, preferably 18%. This filter cake will most advantageously contain only individual, clean potato cells which are substantially free of loose or excess soluble and insoluble starches and sugars and at least partially free of fats, soluble proteins and free amino acids.

After dewatering, the clean potato cells and small aggregates thereof are reslurried by mixing the filter cake with an aqueous medium until the reslurry contains about 7 to 16% potato solids by weight. A desirable product was found to be obtained when the potato concentration in the reslurry was about 10%. The purpose of the reslurrying operation is to put the potato cells in optimum condition for subsequent spray-drying thereof. Optimum concentration of the reslurry mix will to some extent depend upon the particular spray-drying apparatus used and the variety of potato processed. However, if the concentration of potato solids is too high, there will be difficulty in pumping and otherwise handling the reslurry as well as in atomizing the reslurry in the spray drier. When the concentration of the potato reslurry is too low, the cost of spray-drying the reslurry per a specific unit of dehydrated potato solids obtained will be so high as to render the method uneconomic.

The reslurry step has been found to be a suitable place for blending additives with the clean potato cells which are obtained from dewatering. At this time, such additives as an aerating agent, such as methylcellulose commercially available under the trademark, "Methocel," may be added. "Methocel" is a water-soluble inert, colorless, odorless, tasteless, nontoxic cellulose ether which, when mixed with potato granules, imparts fluffiness. About 0.25 percent to 3.0 percent "Methocel" per weight of potato solids is a preferred range.

Other preferred additives are emulsifiers, typically those which are identified as monoglycerides and which materially offset any pasty, gummy texture that might otherwise be produced in a reconstituted potato product. Generally about 0.10 to 2.50 percent of emulsifier is used, based on the weight of the potato solids. Monoglycerides are intended to mean those products which may be produced by direct esterification or by molecular distillation of a reaction mixture including triglyceride fats, and will vary in their degree of esterification and fatty acid identity. By the use of such a term it is not intended to foreclose the presence of other fatty acid esters, such as triglyceride and diglyceride fats, although the monoglycerides are preferred. For the purposes of the present invention, it is preferred that the monoester comprise from about 40 to 100%, preferably 90%, of the total ester. Generally, as the level of monoester increases, freedom from pastiness correspondingly increases. Typical of those monoglycerides which are available commercially and useful as emulsifiers in the present invention are those series of products identified by the trademark, "Myverol." "Myverols" are distilled monoglycerides prepared from various fats and oils and are edible. Other exemplary monoesters suitable for use are propylene glycolmonostearate, propylene glycolmonooleate, diethylene glycolmonostearate, propylene glycolmonopalmitate, and propylene glycolmonolaurate. While these exemplary emulsifiers are preferably blended with the potato solids in the filter cake directly after dewatering as the filter cake is being reslurried, they may also be blended with spray-dried product or in the slurry or mash and other points in the process.

The reslurried potatoes with additives are now spray-dried. The specific spray-drying equipment used may vary, for example, the drying gas, ordinarily heated air, may be directed cocurrent or countercurrent to the flow of the liquid being dehydrated. Regardless of the type of spray-drying which is practiced, the temperatures utilized to spray-dry the potato reslurry must be such that scorching of the potatoes does not occur. It has been found that when the inlet air is at a too high a temperature, for example, above about 550° F., the potato solids "toast," i.e., they acquire a tan color and sometimes pick up and odor and off taste. At too low an inlet temperature there will not be sufficient removal of moisture from the atomized reslurry. There is, of course, no absolute minimum temperature of the air which is used at the inlet point in the spray-drying tower, since such minimum would differ with respect to the quantity of atomized reslurry which is being spray-dried per given period of time as well as the height of the spray-drying tower. It will be apparent that the higher the tower, the lower the temperature at which spray-drying may be carried out. In a cocurrent spray-drying operation, it has been found that a preferred inlet temperature of the air used to dry the atomized slurry is about 250°–550° F., most preferably 380°–420° F. The maximum outlet temperature of the air is about 260° F., with an outlt air temperature of about 225° F. to 235° F., say 230° F., being preferred. The outlet temperature of the product should generally not exceed about 200° F. to avoid excessive browning and toasting. The product from the spray-drier is screened to remove clumps.

The preferred moisture content of the potato granules which are to be packaged and marketed as a final product has been determined to be about 5–6½%, although the moisture content may be such as will not cause the product to spoil and which will exhibit good storage stability. Moisture content substantially above this has been found to cause spoilage more easily than in products within the moisture range. A most preferred range is 5½–6% moisture.

The present invention will be better understood by reference to the accompanying drawings, which form a part of this application, and in which the sole figure is a flow diagram representing a preferred embodiment of the process of the present invention. The diagram will be referred to in detail in the following description of that preferred embodiment.

Field run Idaho Russet Burbank Potatoes (utility grade) having a solids content between 18 and 26% were selected. These potatoes had been stored prior to processing at a temperature of 55° F. and ambient relative humidity. The potatoes had the customary amount of rot for a utility grade batch of potatoes. Immediately prior to processing they were conditioned for two weeks by storage at 70° F. in an air-conditioned room having 50% relative humidity; after two weeks of storage the potatoes had a total sugar content of less than 5% and a level of reducing sugars measured as dextrose of 1.9% by weight of the potato solids (dry basis).

The conditioned potatoes were removed from the dump 10 and brush scrubbed in an elongated chamber 11, which was tilted so that the potatoes entered at the upper end and were discharged by gravity from the lower end. Located in the elongated, cylindrical chamber 11 were a plurality of rotating brushes 11a mounted for rotation on elongated rods 11b, which had axes parallel to the axis of the chamber 11. After entering at the upper end of the chamber 11, the potatoes were discharged onto the rotating brushes 11a, which brushes were spaced so closely together that the potatoes did not fall between adjacent brushes. As the brushes abraded the potatoes, jets of water from spray heads 12 were directed on the potatoes to wash dirt and rot from the potatoes into the spaces between the brushes 11a and to the bottom of the chamber 11, from which the dirt was removed. As a result of this scrubbing and washing, the potatoes had substantially all of their surface dirt removed and were clean with the exception of peel, eyes, surface bruises and some rot, wherever it occurred. The thoroughly cleaned potatoes were sliced to 11/16 inch in a slicer 13 and then soaked in a 0.2% sodium metabisulfite solution 14 for 30 minutes to inhibit post-slicing browning of the potatoes. Transportation through the solution 14 was provided by a screw conveyer 15.

The raw, sulfate-treated potato slices were then precooked by immersion in water at a temperature of 160° F. In some varieties of potatoes it may be necessary to precook in a 2% sodium acid pyrophosphate aqueous solution. The slices were advanced by means of a screw conveyor 16 countercurrent to the flow of water. The potatoes were treated for approximately 20 minutes or until the internal temperature of the potatoes was 150°–155° F. Incident to precooking, sugars, starches, proteins and fat were partially extracted; thus, at the end of the precooking step the potato slices were leached to a point at which the total sugars present was 1.85% and the reducing sugar content measured as dextrose was 0.83% by weight of the potato solids. The solids content of the potatoes had not materially altered during this period.

The precooked slices were discharged onto an inclined belt conveyor 17 on which they were subjected to cold water sprays directed on the belt by means of spray nozzles 18. The temperature of the water directed from the spray nozzles 18 was about 50° F. and the potato slices remained on the conveyor belt 17 for about 25 minutes or until the internal potato slice temperature had been reduced to less than 70° F. By virtue of the precooking and water quenching the ultimately cooked and mashed potatoes are put in a condition in which they are resistant to the development of a pasty texture. In addition, it has been found that so-treated, dehydrated potatoes can be better reconstituted in boiling water and that the recovery of potato solids is increased by virtue of the precook-quench sequence described herein. At the end of that sequence the quenched potatoes had a total sugars content of 1.57% and a reducing sugars content of 0.69%.

After cooling, the potato slices were immediately transferred to a continuous belt steam cooker 19, where saturated steam was introduced at atmospheric pressure for a period of 22 minutes or until the potatoes had been cooked to a mashable condition. As a result of steam cooking, the starch in the potato cells was substantially gelatinized and a cooked flavor produced. The cooked potatoes were then conveyed by a belt to a set of oppositely rotating, stainless steel crushing rolls 20, which had a clearance between them of 0.04 inch, the rolls having a diameter of 12 inches and rotating at 22 r.p.m. The potatoes were gently crushed as they passed through the nip of the rolls and, after passing through, still contained substantially all the peel, eyes and other defects present on the slices; the mash also contained cell aggregates in addition to individual potato cells. Mashing was not carried out to a point at which dough-like consistency was produced or at which the potato cells were homogeneously subdivided. The mashed potatoes had the appearance of clumps of baked potatoes which had been spooned or otherwise removed from a potato jacket.

The resulting mash was blended continuously with an equal weight of water at a temperature of 50° F. in a slurry mixer 21 to yield a slurry having a solids content of about 10%. Included in the slurry water was a quantity of antioxidant and sodium metabisulfite solution measured as 40 p.p.m. sulfur dioxide on a total slurry basis. The homogeneous mixture thus produced was at a temperature of about 110° F. and was immediately pumped to and passed over a vibrating 5-mesh screen 22. The slurry was subjected to screening immediately to prevent flavor loss and conditioning of the potato solids to an extent which would result in grainy texture in the reconstituted product. Preferably, the slurry of the potato solids is not elevated to a temperature above 130° F. to mitigate cell rupture. Screening of the slurry removed pieces of peel, eyes and rot, which could be discarded or reclaimed.

After passing through screen 22, the slurry was directed to a pulper 23, which had a screen having 0.033 inch openings. The thrus fed to the pulper 23 may be described as a relatively clean suspension of potato cells with some solubilized starch and other solubilized chemical constituents including fat, sugar, protein and amino acids, as well as free starch. Most of the peel, large eyes and other defects were removed at the screen 22. In pulper 23 small peel specks, eyes and residual rot were retained on the pulper screen and by-passed. The slurry solids were impelled through the screen openings, which retained the undesirable portions described above. In carrying out the pulping operation, care was exercised to avoid too vigorous agitation of the slurry solids as such would damage the potato cells, and hence the pulper was operated at a speed sufficient to impel the slurry solids through the screen openings of the pulper, but insufficient to alter materially the physical condition of the potato cells themselves, although a minimum amount of cell rupture did take place.

The pulped slurry was then dewatered to approximately 17% solids by passing it through a continuous, horizontal vacuum filter 24. The filter utilized comprised a molded rubber belt with holes therethrough and a filter cloth which rides on the belt. When the holes in the molded belt pass over and are in registration with holes in a vacuum chamber located below the belt, filtration of the material on the filter cloth takes place. The slurry spreads out on the belt and is in the form of a filter cake at the discharge end of the vacuum filter, a doctor blade being used to scrape the cake from the filter cloth. In effecting dewatering, the pulped slurry was deposited on the filter cloth at a depth of ⅛–¼ inch. The attainment of higher vacuums permits the maintenance of thicker beds of slurry. In the present example, the vacuum in the chamber below the belt and filter cloth was about 10 inches of Hg. After dewatering, the potatoes had a total sugars content of 0.93% and a reducing sugars content of 0.28%.

The filter cake from dewatering was simultaneously blended with additional ingredients and reslurried with water to a 10% reslurry concentration. Reslurrying and blending was carried out in a mixer 24a, which was a paddle type blender in the form of a trough with relatively slowly rotating paddles, which were rotated at that slow speed in order to lessen cell damage. Both blending ingredients and the reslurry water were introduced at the feed end of the blender. The blending ingredients so introduced were "Myverol" 1807, methylcellulose ("Methocel"), an antioxidant (butylated hydroxytoluene, propylene glycol and citric acid in a solution of propylene glycol), and a combination of sodium sulfite and sodium metabisulfite in amounts to yield 0.5% of the mono- and diglyceride emulsifier, 1.25% methylcellulose, 50 p.p.m. antioxidant, and 50 p.p.m. sulfur dioxide, all on a dry weight potato solids basis. The fresh water was introduced at 60° F. and a resultant homogeneous slurry of potato solid and blend ingredients with water was discharged from the outlet end of the mixer 24a. The reslurry was then directed to a hold tank 25 directly above the spray drying tower 26, care being taken to avoid potato cell damage. From hold tank 25 the potato reslurry was then led into tower 26.

The spray drying tower 26 was a vertical, elongated, cylindrical tower 12 feet in diameter and 41 feet in overall height. Twelve feet from the bottom of the tower the spray dryer assumes the shape of an inverted, frusto-conical figure, the inverted cone section terminating in a discharge opening at the bottom of the tower. The spray tower was equipped with a cyclone dust collector for collecting fine potato particles (fines), which were later to be combined with the coarser particles collected at the base of the tower. The potato slurry was pumped to a smooth 3-tier 9-inch bowl atomizer 27 rotating at 4600 r.p.m. The atomizer was located at the center of the 12-foot tower 2 feet 3 inches from the top of the tower and operated to form a pattern whose outline covered substantially the entire cross section of the tower. The droplets formed descended cocurrently with the downward draft of hot, drying air at an inlet temperature of 400° F., which air was introduced at the top of the tower at 3000–6000 s.c.f.m. The slurry was fed from the top of the tower at 1⅔ g.p.m. The droplets were dehydrated as they descended for collection at the trough at the bottom of the tower. The outlet temperature of the dehydrating air was maintained at about 240° F. and the outlet temperature of the potato product at about 235° F.

The fines, which exited with the dehydrating air at a moisture of about 6%, were passed with the outlet air to a dust collector 29, from which the fines were separated. The coarser potato particles were collected at the base of the spray drying tower 26 and passed on to a vibrating 16-mesh screen 30 propelled by a conveyor belt. Those potato particles that passed through the vibrating screen 30 were collected and blended with the product from dust collector 29.

The spray-dried product produced in accordance with the process outlined hereinbefore had a creamy, yellow color and was in the form of powder having a density of 0.4–0.5 gram per cc. The product was generally in the form of individual potato cells and small agglomerates of potato cells, the cells having a mean diameter of about 150 microns. When 82 grams of the dried product was dry blended with 6% nonfat milk solids and reconstituted in 390 cc. of boiling water containing a half of a teaspoon of salt and two tablespoons of butter, a very dry, mealy mash was produced having a texture like that of baked potatoes. The subsequent addition of 60 cc. of cold milk followed by vigorous mixing, produced a very light, fluffy, nonpasty product with a creamy color. This product was devoid of scorched flavor and free from specks of unrehydratable particles and clusters; the product was quite like fresh, mashed potatoes. The spray-dried product had a total sugars content of 0.86% and a reducing sugars content of 0.27%.

The spray-dried potato powder of the invention is quite amenable to relatively harsh treatment involved in direct reconstitution with boiling water, that is, the product does not be come pasty even under vigorous whipping. Moreover, the spray-dried product can be reconstituted in hot water at temperatures below boiling (above say 150° F.) and will readily rehydrate without clumping or leaving partially rehydrated grits and without introducing additional graininess or a superfine, flowery texture to the product. The product can also be whipped to the desired light, fluffy, nonpasty consistency. When the product of the invention is reconstituted and whipped, it provides a higher volume per gram of dehydrated product than other such products now in commerce.

It will be apparent that certain alterations and modifications of the process described hereinbefore and schematically illustrated in the drawing will be made by those skilled in the art without departing from the scope of our invention. Such alterations and modifications are, therefore, deemed to fall within the purview of the present invention, which is to be limited only by the scope of the following appended claims.

We claim:

1. A process for preparing a dehydrated potato product, comprising cooking potatoes until they are soft enough to mash, mashing the cooked potatoes, slurrying the mashed potatoes with sufficient aqueous medium to form a slurry containing about 7 to 16 percent potato solids, dewatering the slurry to a filter cake, slurrying the dewatered potatoes to form a reslurry containing about 7 to 16 percent potato solids, and spray-drying the reslurried potatoes.

2. A process as claimed in claim 1, in which said spray-drying is carried out employing a drying gas inlet temperature of about 250° to 550° F. and a drying gas outlet temperature of about 200° to 260° F.

3. A process as claimed in claim 2, in which said drying gas inlet temperature is about 380° to 420° F. and said drying gas outlet temperature is about 225° to 235° F.

4. A process as claimed in claim 1, in which said dewatering of the potato slurry is carried out employing horizontal vacuum filtration means.

5. A process for preparing a dehydrated potato product, comprising providing potatoes containing undesirable portions, cooking the potatoes until they are soft enough to mash, mashing the cooked potatoes, slurrying the mashed potatoes with sufficient aqueous medium to form a slurry containing about 7 to 16 percent potato solids and including said undesirable potato portions, mechanically separating said undesirable potato portions from the potato slurry, dewatering the potato slurry to a filter cake, slurrying the dewatered potatoes to form a reslurry containing about 7 to 16 percent potato solids, and spray-drying the reslurried potatoes.

6. A process as claimed in claim 5, in which said dewatering is carried out until the filter cake has a solids content of about 14 to 22 percent.

7. A process as claimed in claim 6, in which the filter cake has a solids content of about 18 percent.

8. A process as claimed in claim 5, in which said separating undesirable potato portions is effected by passing said slurry through a screen having an aperture size from U.S. No. 4 to 14.

9. A process for preparing a dehydrated potato product, comprising providing potatoes containing undesirable portions, cooking the potatoes until they are soft enough to mash, mashing the cooked potatoes, slurrying the mashed potatoes with sufficient aqueous medium to form a slurry containing about 7 to 16 percent potato solids and including said undesirable potato portions, mechanically separating the undesirable potato portions from the potato slurry, dewatering the potato slurry to a filter cake containing about 14 to 22 percent solids, reslurrying the dewatered potatoes to form a reslurry containing about 7 to 16 percent potato solids while simultaneously blending with said filter cake and the reslurry medium an agent selected from the group consisting of emulsifiers, fluffing agents, antioxidants, and bleaching agents and combinations thereof, and spray-drying the reslurried blended potatoes.

References Cited by the Examiner

UNITED STATES PATENTS 2,564,296   8/1951   Bostock _____ 99—207

OTHER REFERENCES

Cording et al.: U.S. Dept. of Agr. Bulletin ARS–73–2, article entitled, "Potato Flakes—A New Form of Dehydrated Mashed Potatoes," Nov. 15, 1954, pages 1 to 5.

A. LOUIS MONACELL, *Primary Examiner.*

S. J. BAICKER, *Assistant Examiner.*